No. 627,433. Patented June 20, 1899.
J. B. MANCHESTER.
ROOF COLLAR AND VENT PIPE CONNECTION.
(Application filed Dec. 27, 1898.)
(No Model.)

WITNESSES:
Harry J. Garceau
Walter E. Burton

INVENTOR:
James B. Manchester
L. Scholfield
BY ATTY.

UNITED STATES PATENT OFFICE.

JAMES B. MANCHESTER, OF PROVIDENCE, RHODE ISLAND.

ROOF-COLLAR AND VENT-PIPE CONNECTION.

SPECIFICATION forming part of Letters Patent No. 627,433, dated June 20, 1899.

Application filed December 27, 1898. Serial No. 700,452. (No model.)

*To all whom it may concern:*

Be it known that I, JAMES B. MANCHESTER, a citizen of the United States, residing at Providence, in the State of Rhode Island, have invented a new and useful Improvement in Roof-Collar and Vent-Pipe Connections, of which the following is a specification.

Heretofore in connecting a vertical ventilating or soil pipe or a steam-pipe to a roof-collar the pipe has been so connected to the collar that the contraction and expansion of the pipe, due to alternating changes of temperature, cause the breaking away of the collar from the roof or the loosening of the pipe from the collar, thus causing a leak; and it is the object of my invention to provide a means for securing the pipe to the collar which will not be liable to the above objection; and my invention consists in the employment of an attached ring having at its under side an annular groove for the reception of the upper edge of the roof-collar and in the means for attaching the grooved ring to the pipe, as hereinafter fully set forth.

Figure 1:
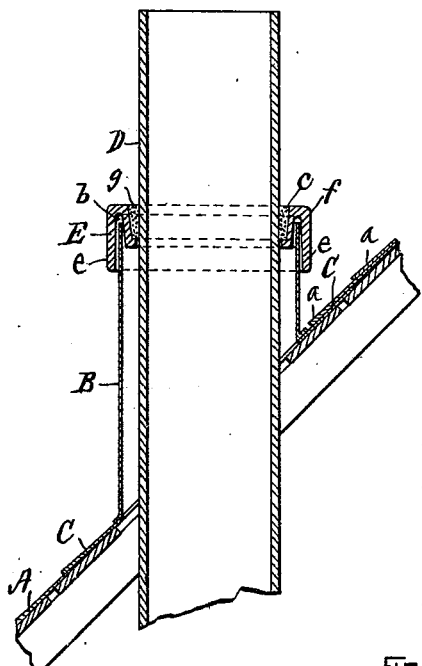
Figure 3:
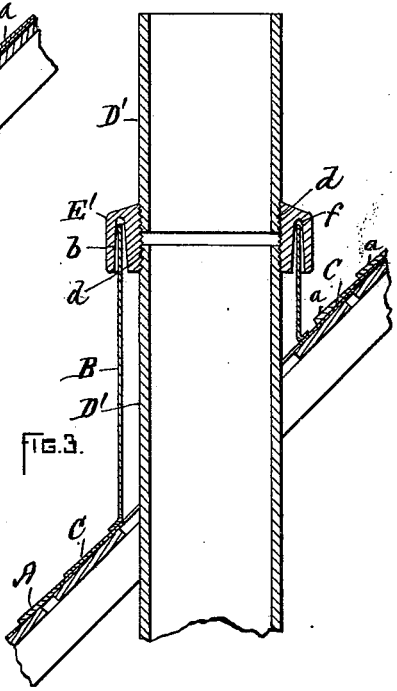
Figure 2:
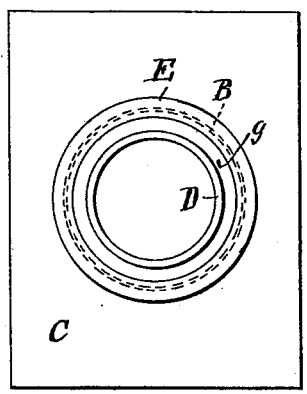

In the accompanying drawings, Figure 1 represents an axial section of the pipe and the roof-collar. Fig. 2 represents a top view of the same. Fig. 3 represents an axial section showing another means of attaching the ring to the pipe, the ring forming a pipe-coupling.

In the drawings, A represents the roof of the building, B the sheet-metal pipe of the collar, to which is secured the obliquely-set attaching-flange C, which at its upper side is covered by means of the shingles $a\,a$. Upon the upwardly-projecting pipe D is secured the ring E, provided at its under side with the annular groove $b$, adapted to receive the edge $f$ of the pipe B, and with an annular recess $c$, by means of which the ring E is to be attached to the pipe D, and to accomplish this in the readiest manner I bend a rectangular bar of lead into the form of a ring of suitable size and place it in the recess $c$, surrounding the pipe D, and then swage the lead ring $g$ tightly into the recess $c$, thus forming a tight joint between the ring E and the pipe D. The downwardly-extending annular flange $e$ serves to effectually prevent the entrance of water into the space between the inner wall of the pipe B of the collar and the outer side of the pipe D. When the ring E is arranged upon the pipe D and the collar-pipe B, as shown in the drawings, the expansion and contraction of the pipe D will not disturb the roof-collar, the ring E rising and falling with the variation in the length of the pipe D without causing a corresponding change in the position of the roof-collar.

In Fig. 3 the ring E' is employed as a coupling to connect two lengths of pipe to each other, the said ring being screw-threaded internally to receive the external screw-thread $d$ of the pipes D' D', and in this case the lead packing of Fig. 1 is dispensed with, and in both cases the expansion and contraction of the vertical pipe will not affect the roof-collar, which has its upper edge $f$ located in the groove $b$. When the ring is formed with a groove $b$, which extends downward from above the end of the collar-pipe B, both upon its outer and inner sides, the ring can be made much narrower and lighter than when otherwise constructed and will have greater strength to resist the bursting pressure caused by the lead packing-ring $g$.

I claim as my invention—

1. The combination of the roof-collar, with the ring attached to the upwardly-extending pipe, and having an annular groove at its under side, the walls of which extend downward from above the end of the collar-pipe, both upon its outer and inner sides, substantially as described.

2. The combination of the roof-collar, with the ring which forms a coupling between the ends of adjoining lengths of the upwardly-extending pipe, and having an annular groove at its under side, the walls of which extend downward from above the end of the collar-pipe, both upon its outer and inner sides, substantially as described.

JAMES B. MANCHESTER.

Witnesses:
SOCRATES SCHOLFIELD,
WALTER E. BURTON.